United States Patent [19]
McCollough et al.

[11] Patent Number: 5,361,204
[45] Date of Patent: Nov. 1, 1994

[54] SEARCHING FOR KEY BIT-MAPPED IMAGE PATTERNS

[75] Inventors: William J. McCollough, Alexandria; David B. Kelly, McLean, both of Va.

[73] Assignee: The Titan Corporation, San Diego, Calif.

[21] Appl. No.: 854,463

[22] Filed: Mar. 19, 1992

[51] Int. Cl.⁵ .............................................. G06F 15/38
[52] U.S. Cl. .......................... 364/419.07; 364/419.13; 382/9; 382/41
[58] Field of Search .................... 364/419; 382/9, 22, 382/38, 10, 16, 41, 48; 395/600, 725

[56] References Cited
U.S. PATENT DOCUMENTS

| | | | |
|---|---|---|---|
| 5,131,053 | 7/1992 | Bernzott et al. | 382/9 |
| 5,133,024 | 7/1992 | Froessl | 382/41 |

OTHER PUBLICATIONS
"Searching Scanned Documents", PC Magazine, Oct. 15, 1991, p. 440.

Primary Examiner—Roy N. Envall, Jr.
Assistant Examiner—Frantzy Poinvil
Attorney, Agent, or Firm—Edward W. Callan

[57] ABSTRACT

A system for searching for keywords and/or keyphrases and/or keysymbols in a data memory containing bit-mapped image patterns for words and/or symbols constructs a keyword/phrase/symbol recognition pattern of the keyword/phrase/symbol to be searched for; scans the data memory to access the bit-mapped image patterns; and processes the constructed keyword/phrase/symbol recognition pattern and the accessed bit-mapped image patterns by correlation to determine the presence in the data memory of a bit-mapped image pattern for the keyword/phrase/symbol.

10 Claims, 2 Drawing Sheets

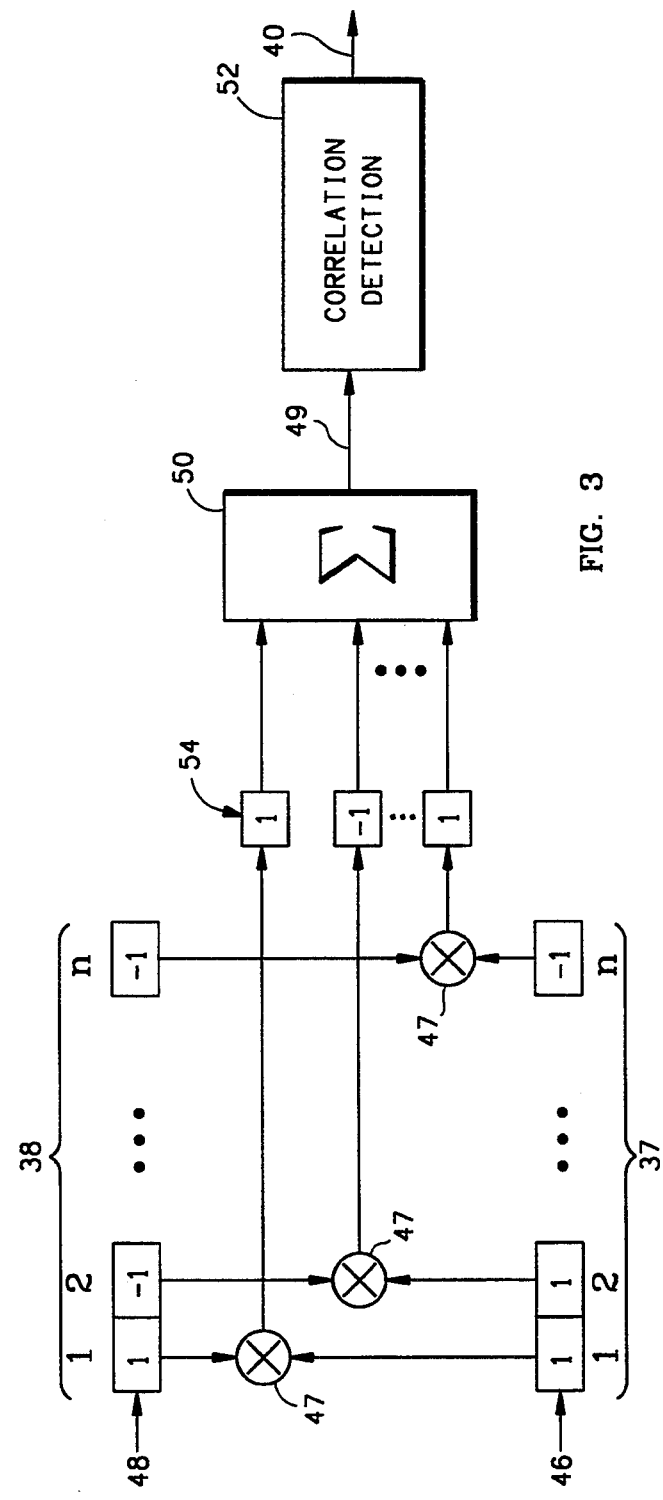

SEARCHING FOR KEY BIT-MAPPED IMAGE PATTERNS

BACKGROUND OF THE INVENTION

The present invention generally pertains to electronic data processing and is particularly directed to searching for keywords, keyphrases and/or keysymbols in a data memory containing data derived in response to optical scanning of documents or in response to computer-generated representations of text. The symbols to be searched for include, but are not limited to, Oriental-language characters and logos.

It is known to use an optical character recognition (OCR) technique to derive digital code patterns representative of text and to store such code patterns in a data memory, whereby the code patterns stored for each of the different characters in the text are unique. However, searching an OCR-derived data memory for keywords or keyphrases is too slow for use with large data bases because of the necessity of searching the data memory for the code patterns for each of the different characters of the keyword or keyphrase.

It also is known to store computer-generated representations of words and symbols in a data memory. An example is the storage of computer-generated representations of words and symbols in text created by a word processor. A word processor that creates such representations of words and symbols is also used to search for keywords, keyphrases and/or keysymbols in such text by recreating representations of the keyword/phrase/symbol, scanning the data memory to access the representations of text stored therein and comparing the representations of text accessed from the memory with the recreated representations of the keyword/phrase/symbol.

SUMMARY OF THE INVENTION

The present invention is a system for multiple character searching for keywords and/or keyphrases in a data memory containing bit-mapped image patterns for words. The system includes means for constructing a recognition pattern of the keyword, or the keyphrase to be searched for; means for scanning the data memory to access the bit-mapped image patterns; and means for correlation processing the constructed recognition pattern instaneously with the accessed bit-mapped image patterns to determine the presence in the data memory of said bit-mapped image pattern for the keyword/phrase.

A bit-mapped image pattern of a word or symbol is a pattern of 1 bits and 0 bits representative a line-scanned image of the word or symbol. Since a displayed word or symbol is either darker or lighter than a contrasting background, when the word or symbol is line-scanned through a horizontal section thereof, a 1-bit would, for example, represent a scanned portion of the word or symbol, whereby a 0-bit would represent the background. Bit-mapped image patterns of words and symbols are derived from optically scanned images of words and/or symbols when a document containing words and/or symbols is scanned by an optical scanner of a facsimile device. Bit-mapped image patterns of words are also derived from computer-generated representations of words and/or symbols created by a word processor when such representations are formatted to cause the words and/or symbols to be displayed on a video monitor in a raster scan made up of a series of horizontal sections of each displayed line of the words and/or symbols.

Since words include a plurality of characters, searching for bit-mapped image patterns derived from words is quicker than searching for combinations of code patterns representing combinations of characters, such as derived by OCR technology.

In addition, by using a recognition pattern representative of the keyword/phrase for instantaneous processing with the patterns accessed from the data memory to determine the presence in the data memory of a bit-mapped image pattern derived from the keyword/phrase, it is possible to make such determination based upon patterns representative of less than the number of horizontal scans necessary to encompass the entire vertical extent of the keyword/phrase, even as little as a pattern representative of a scan of a single horizontal section of the word, or phrase, whereby the search time can be further reduced.

Additional features of the present invention are described in relation to the description of the preferred embodiment.

BRIEF DESCRIPTION OF THE DRAWING

FIG. 2 illustrates the construction of a keyword recognition pattern representing an optical scan of a single horizontal section of a keyword.

FIG. 3 illustrates correlation processing of an image pattern with a recognition pattern to determine the presence in the data memory of an image pattern derived from a keyword/phrase/symbol.

DESCRIPTION OF THE PREFERRED EMBODIMENT

Figure 1:
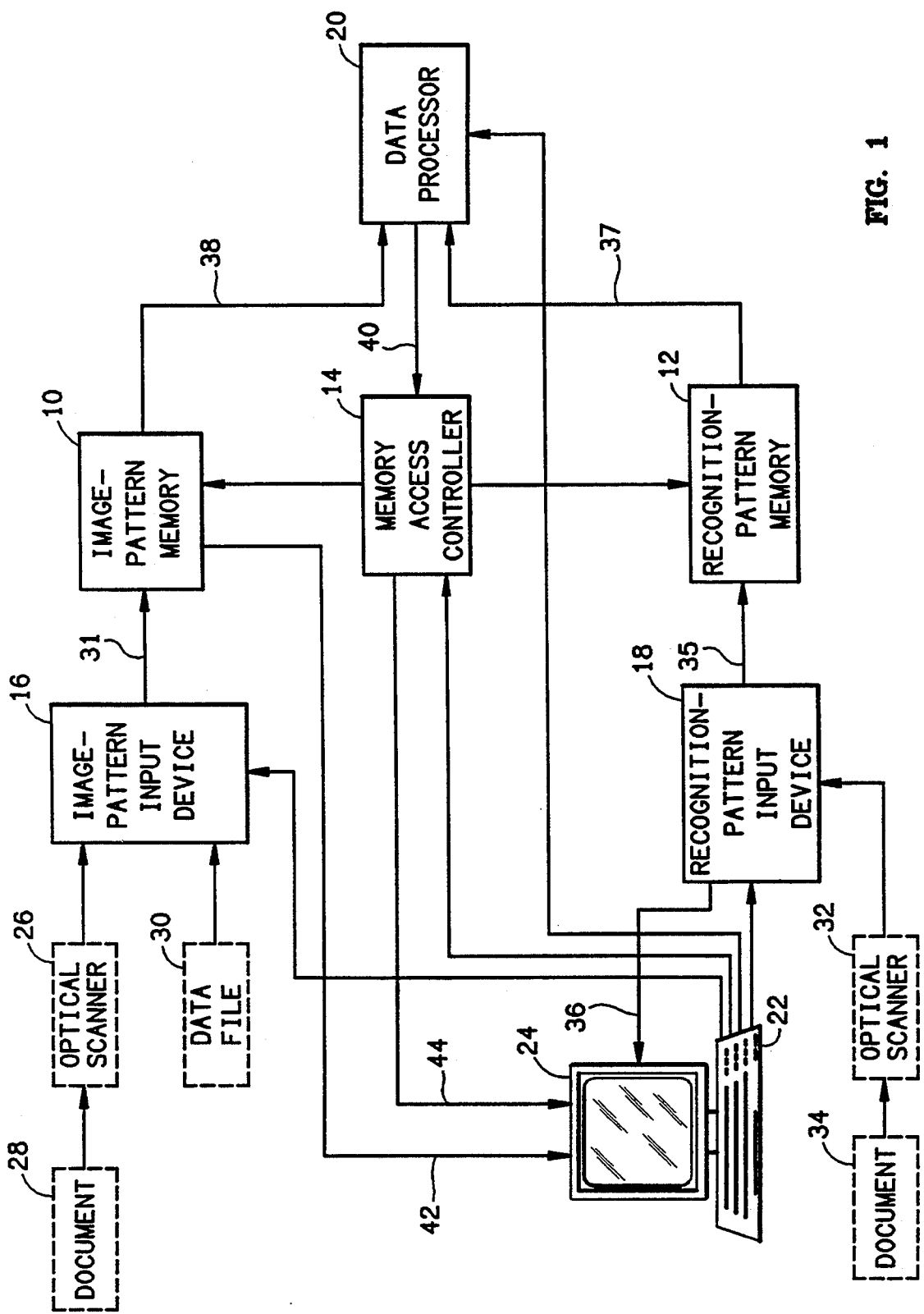
FIG. 1 is a block diagram of a system according to the present invention.

Referring to FIG. 1, a preferred embodiment of the system of the present invention includes an image-pattern memory 10, a recognition-pattern memory 12, a memory-access controller 14, an image-pattern input device 16, a recognition-pattern input device 18, a data processor 20, a keyboard 22 and a display monitor 24.

The image-pattern input device 16 is coupled to an optical scanner 26 and derives bit-mapped image patterns of text and/or symbols on a document 28 in response to signals generated by the optical scanner 26 upon optically scanning the document 28.

The image-pattern input device 16 is also coupled to a data file 30 containing computer-generated representations of text and/or symbols and derives bit-mapped image patterns of text and/or symbols represented by the computer-generated representations in the data file 30.

Operation of the image-pattern input device 16 is controlled by the keyboard 22. The bit-mapped image patterns 31 of text and symbols derived by the image-pattern input device 16 are stored in the image-pattern memory 10.

The search for keywords, keyphrases and keysymbols is controlled by operating the keyboard 22, which is coupled to the memory access controller 14, the image-pattern input device 16, the recognition-pattern input device 18, the data processor 20 and the display monitor 24.

The keyboard 22 is operated to compose the keyword, keyphrase or keysymbol to be searched for; and the recognition-pattern input device 18 responds to such operation of the keyboard by constructing a recognition pattern of the keyword/phrase/symbol.

The recognition-pattern input device 18 also is coupled to an optical scanner 32 for alternatively constructing a recognition pattern of the keyword/phrase/symbol to be searched for in response to signals generated by the optical scanner 32 upon optically scanning a graphic image of the keyword/phrase/symbol on a document 34.

Preferably, the constructed recognition pattern represents a scan of only a single horizontal section of the keyword/phrase/symbol. It has been discovered that for most words of nontrivial length, distinctive recognition patterns can be constructed even though the recognition pattern represents a scan of only a single horizontal section of the word. FIG. 2 illustrates an example of the construction of a keyword recognition pattern representing a scan of a single horizontal section of the word "MESSAGE" taken through approximately the vertical midpoint of the word.

The recognition-pattern 35 of the keyword/phrase/symbol constructed by the recognition-pattern input device 18 is stored in the recognition-pattern memory 12; and such keyword/phrase/symbol 36 is displayed on the video monitor 24.

The keyboard 22 is then operated to activate the memory-access controller 14. The memory-access controller 14 accesses the recognition-pattern 37 of the keyword/phrase/symbol from the recognition-pattern memory 12 and also scans the image-pattern memory 10 to access the bit-mapped image patterns 38 stored therein.

The data processor 20 processes the accessed recognition pattern 37 and the accessed bit-mapped image patterns 38 by correlation to determine the presence in the data memory 10 of a bit-mapped image pattern for the keyword/phrase/symbol. Whenever the processor determines the presence in the image-pattern memory 10 of a bit-mapped image pattern for the keyword/phrase/symbol, the data processor 20 provides a match signal 40 to the memory-access controller 14, which responds thereto by causing an indication of such presence determination to be displayed by the monitor 24. Such an indication may include a display in response to signals 42 derived from the portion of the image-pattern memory 10 containing the keyword/phrase/symbol and/or a display of information 44 identifying the location of the keyword/phrase/symbol in a document represented by the image-patterns stored in the image-pattern memory 10.

Correlation processing by the data processor 20 is described with reference to FIG. 3. The bits of a recognition pattern 37 that is n-bits in length are entered into a first storage array 46 and respectively compared by multiplication routines 47 with n consecutive bits of the image patterns 38 that are accessed from the image-pattern memory 10 and entered into a second storage array 48; and a summation value 49 representative of the result of said comparison is provided by a summation routine 50. The summation value 49 is then processed in accordance with a correlation detection routine 52 to determine whether the summation value 49 meets or surpasses a given threshold to thereby determine the presence in the image pattern memory 10 of an image pattern derived from a keyword/phrase/symbol. Following each comparison of a sequence of n bits of the image pattern 38, the image pattern being accessed from the image-pattern memory 10 is incrementally shifted one bit position through the second storage array 48.

When the recognition pattern 37 is accessed from the recognition-pattern memory for entry into the first storage array 46, the 1-bits are converted to a plus-1 value and the 0-bits are converted to a minus-1 value. The 1-bits and 0-bits of the image pattern are likewise converted to a plus-1 value and a minus-1 value respectively when the the image pattern 38 is accessed from the image-pattern memory 10 for entry into the second storage array 48. The 1 and 1 values shown in the first storage array 46 and the second storage array 48 in FIG. 3 are merely exemplary, When the first n-bits of the image pattern are entered into the second storage array 48, a bit-offset counter (not shown) is set to a count of zero, Comparison of the recognition pattern 37 in the first storage array 46 with the image pattern 38 then present in the second storage array 48 is accomplished by multiplication 47 of the bits in respectively corresponding positions of the first storage array 46 and the second storage array 48. The results of the multiplication 47 are stored in a third storage array 54, from which the summation value 49 of the contents of the third storage array is determined by the summation routine 50.

The correlation detection routine normalizes the summation value 49 by dividing by n, and then compares the normalized summation value to the the given detection threshold, which is set prior to the beginning of the processing to a value between 0 and 1, such as 0.8. for example.

When the summation value 49 equals or exceeds the given detection threshold, the match signal 40 is provided to the memory access controller 14. The match signal indicates the bit offset count for which the match signal is provided.

After each comparison of a sequence of n bits of the image pattern 38, the bit offset count is incremented by one count as the image pattern being accessed from the Image-pattern memory 10 is incrementally shifted one bit position through the second storage array 48; and the comparison routine 47 is then repeated for the next sequence of n bits in the second storage array 48.

We claim:

1. A system for searching for multiple-character keywords and/or keyphrases in a data memory containing bit-mapped image patterns for words, comprising
   means for constructing a recognition pattern of the keyword or the keyphrase to be searched for;
   means for scanning the data memory to access the bit-mapped image patterns; and
   means for correlation processing the constructed recognition pattern instantaneously with the accessed bit-mapped image patterns to determine the presence in the data memory of said bit-mapped image pattern for the keyword/phrase.

2. A system according to claim 1, wherein the constructed recognition pattern represents a scan of a single horizontal section of the keyword/phrase.

3. A system according to claim 1, wherein the bit-mapped image patterns in the data memory were derived in response to optical scanning of text documents; and
   wherein the constructing means construct the recognition pattern in response to optically scanning a graphic image of the keyword/phrase.

4. A system according to claim 1, wherein the bit-mapped image patterns in the data memory were derived in response to computer-generated representations of text; and wherein the constructing means construct the recognition pattern in response to operation of a recognition-pattern composition device.

5. A system according to claim 1, wherein the bit-mapped image patterns in the data memory include patterns that were derived in response to optical scanning of text documents and patterns that were derived in response to computer-generated representations of text; and wherein the constructing means are adapted from constructing the recognition pattern in response to optically scanning a graphic image of the keyword/phrase and alternatively for constructing the recognition pattern in response to operation of a recognition/pattern composition device.

6. A system according to claim 1, further comprising means for storing the constructed recognition patterns; and means for accessing the stored recognition pattern in response to a computer-generated representation of the keyword/phrase for said processing with the accessed bit-mapped image patterns.

7. A system according to claim 1, wherein the recognition pattern is an n-bit pattern; and wherein the correlation processing means comprise means for respectively comparing each of the bits of the recognition pattern with a bit in a corresponding bit position of a sequence of n consecutive bits of the accessed image patterns;

means for providing a summation value representative of the result of said n comparisons; and means for determining that the image pattern of the keyword/phrase is present in the data memory when the summation value meets or surpasses a given threshold.

8. A system according to claim 7, wherein the determining means comprise means for dividing said summation value by n to provide a normalized summation value; and means for comparing the normalized summation value with said given threshold.

9. A system for searching for keywords and/or keyphrases and/or keysymbols in a data memory containing bit-mapped image patterns for words and/or symbols, comprising means for constructing an n-bit recognition pattern of the keyword, the keyphrase or the keysymbol to be searched for;

means for scanning the data memory to access the bit-mapped image patterns; and means for correlation processing the constructed recognition pattern with the accessed bit-mapped image patterns to determine the presence in the data memory of said bit-mapped image pattern for the keyword/phrase/symbol;

wherein the correlation processing means comprise means for respectively comparing each of the bits of the recognition pattern with a bit in a corresponding bit position of a sequence of n consecutive bits of the accessed image patterns;

means for providing a summation value representative of the result of said n comparisons; and means for determining that the image pattern of the keyword/phrase/symbol is present in the data memory when the summation value meets or surpasses a given threshold.

10. A system according to claim 9, wherein the determining means comprise means for dividing said summation value by n to provide a normalized summation value; and means for comparing the normalized summation value with said given threshold.

* * * * *

UNITED STATES PATENT AND TRADEMARK OFFICE
CERTIFICATE OF CORRECTION

PATENT NO. : 5,361,204

DATED : November 1, 1994

INVENTOR(S) : McCollough et al.

It is certified that error appears in the above-identified patent and that said Letters Patent is hereby corrected as shown below:

```
Column 1, line 43, after "keyword", delete the comma.
Column 2, line 18, after "word", delete the comma.
Column 3, line 35, after "correlation", insert --processing--.
Column 4, line 11, change "1 and 1" to --1 and -1--.
Column 4, line 13, after "exemplary" delete the comma, insert a period
Column 4, line 30, after "0.8" change the period to a comma.
Column 4, line 40, change "Image" to --image--.
Column 5, line 12, change "from" to --for--
Column 5, line 17, change "recognition/pattern" to --recognition-pattern--.
```

Signed and Sealed this

Seventh Day of February, 1995

*Attest:*

BRUCE LEHMAN

*Attesting Officer*     *Commissioner of Patents and Trademarks*